US007715611B2

(12) United States Patent
Eaton et al.

(10) Patent No.: US 7,715,611 B2

(45) Date of Patent: May 11, 2010

(54) DOCUMENTATION AUTHENTICATION

(75) Inventors: Stuart John Eaton, Farnborough (GB); Jonathan Geoffrey Gore, Farnborough (GB); Christopher Robert Lawrence, Farnborough (GB); George Jiri Tomka, Greenham (GB); Adam Daykin, Greenwich (GB)

(73) Assignee: Qinetiq Limited (GB)

(*) Notice: Subject to any disclaimer, the term of this patent is extended or adjusted under 35 U.S.C. 154(b) by 1100 days.

(21) Appl. No.: 10/570,741

(22) PCT Filed: Aug. 19, 2004

(86) PCT No.: PCT/GB2004/003571

§ 371 (c)(1), (2), (4) Date: Mar. 7, 2006

(87) PCT Pub. No.: WO2005/024735

PCT Pub. Date: Mar. 17, 2005

(65) Prior Publication Data

US 2007/0014582 A1 Jan. 18, 2007

(30) Foreign Application Priority Data

Sep. 8, 2003 (GB) ................................ 0320957.4

(51) Int. Cl.
*G06K 9/00* (2006.01)

(52) U.S. Cl. ........................ 382/135; 382/137; 382/139

(58) Field of Classification Search .................. 382/137
See application file for complete search history.

(56) References Cited

U.S. PATENT DOCUMENTS

| | | | | |
|---|---|---|---|---|
| 4,455,484 | A | 6/1984 | Whitehead | |
| 4,480,177 | A | 10/1984 | Allen | |
| 6,327,749 | B1 * | 12/2001 | Antinone | 24/67 R |
| 6,403,169 | B1 | 6/2002 | Hardwick et al. | |
| 2005/0097711 | A1 * | 5/2005 | Halstead | 24/303 |

FOREIGN PATENT DOCUMENTS

| | | |
|---|---|---|
| EP | 0276 814 | 8/1988 |
| EP | 0 373 500 | 6/1990 |
| GB | 2042979 | 10/1980 |

* cited by examiner

*Primary Examiner*—Tom Y Lu
(74) *Attorney, Agent, or Firm*—McDonnell Boehnen Hulbert & Berghoff LLP

(57) ABSTRACT

In order to check the authenticity of a banknote or other such document it is printed with two patches of magnetisable ink, and each patch is magnetised to present a multipole sequence of alternating polarity. If the document is folded to bring the two patches together and then rubbed to and fro in the direction of the pole sequences, they will be subject to alternating forces of attraction and repulsion which can be sensed through the fingertips and gives the impression of a physically rippled texture notwithstanding that the patches actually have a smooth surface. The presence or absence of this effect can therefore be used to distinguish between a genuine document bearing such magnetised patches and a counterfeit which may be visually identical but lacks the correct magnetisation. In a variant only one of the patches is printed on the document itself and the other is on a separate "key" device which is rubbed over it to test for the presence of the correct magnetisation.

29 Claims, 2 Drawing Sheets

DOCUMENTATION AUTHENTICATION

BACKGROUND OF THE INVENTION (1) Field of the Invention

The present invention relates to a method of checking the authenticity of a document and to documents adapted for use in such method. More particularly the invention is concerned with a method of document authentication based on the use of magnetic ink and which can be accomplished by simple manipulation, using the human sense of touch as the discriminator. The invention may in principle be applied to the authentication of any kind of document upon which a region of magnetisable ink can be deposited or otherwise attached including, without limitation, banknotes, cheques, credit cards, passports, drivers licences, goods labels, tickets, vouchers, stamps, bonds, stock and share certificates, legal communications and any other such documents of intrinsic or extrinsic value which require protection from the risk of counterfeiting.

(2) Description of the Art

Many machine-readable anti-counterfeiting measures utilising a range of different technologies already exist for the protection of various documents, requiring the use of special external equipment to verify authenticity. Other measures, such as watermarks and holograms, can readily be perceived by the human sense of sight and their level of security depends on the degree of difficulty and/or cost to the potential counterfeiter of reproducing the identical features. One aim of the present invention is to provide an alternative form of anti-counterfeiting measure to be used as an adjunct to existing forms or in appropriate cases as a standalone measure which in a preferred embodiment requires no external equipment to verify authenticity (or in other embodiments requires the use of only a simple external device) so that authentication can be performed by any user aware of the existence of the technique, but whose presence need not be visually apparent to the uninformed, and the reproduction of which would present a technological barrier to the potential counterfeiter.

SUMMARY OF THE INVENTION

In one aspect the invention accordingly resides in a method of checking the authenticity of a document bearing a region of magnetic ink which is magnetised to present a multipole sequence of alternating polarity, the method comprising the step of causing relative movement between said region and a second magnetic region which presents a multipole sequence of alternating polarity, said relative movement being in the direction of said sequences, and detecting by the human sense of touch the consequent process of alternating attraction and repulsion between those regions in the course of such relative movement.

In a second aspect the invention resides in means comprising a document bearing a region of magnetic ink which is magnetised to present a multipole sequence of alternating polarity; and a second magnetic region which presents a multipole sequence of alternating polarity; whereby the authenticity of said document can be checked by causing relative movement between said regions in the direction of said sequences and detecting by the human sense of touch the consequent process of alternating attraction and repulsion between those regions in the course of such relative movement.

In a preferred embodiment the second magnetic region is a second region of magnetic ink on the document itself, and the document can be folded to bring the two regions into a confronting relationship and then manipulated to cause the aforesaid relative movement. In another embodiment, the second magnetic region is borne by a structure separate from the document which is adapted to be passed across the first such region or vice versa.

The invention also resides in a document adapted to have its authenticity checked by a method according to the above-defined first aspect.

DESCRIPTION OF THE FIGURES

These and other aspects of the present invention will now be more particularly described, by way of example, with reference to the accompanying schematic drawings, in which.

DETAILED DESCRIPTION OF THE INVENTION

Figure 1:
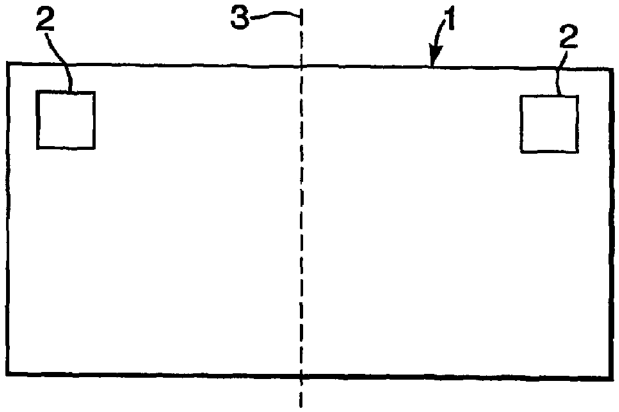
FIG. 1 depicts a banknote which is adapted to be authenticated in accordance with the invention.

FIG. 1 depicts a document 1, which may in this example be a paper or polymer-based banknote, bearing two patches 2 of magnetisable ink disposed symmetrically with respect to the centre line 3. The ink is formulated by loading an ink system with fine magnetisable powder. The powder can be incorporated into an off-the-shelf pigmentless ink system, such as those known as Nylobag, Polyplast or Polyscreen (trade marks of Sericol Limited) or a bespoke system. The ink system will be chosen for optimal magnetic particle filling and may include the use of ink thinners to decrease the viscosity of the loaded ink for ease of printing. The currently preferred magnetic powder is one composed of the alloy $Nd_2Fe_{14}B$ (or variants thereof), which has the highest energy product of magnetic powders currently commercially available, although other candidates include the SmCo class alloys ($Sm_2Co_{17}$, $SmCo_5$), hard ferrite alloys (barium- or strontium-ferrite permanent magnet alloys), AlNiCo class alloys, CoP, FePt or CoPt alloy powders. The powder is preferably used in an ultrafine form (typical particle size distribution from 1-20 μm) with as little size variation as possible, and may therefore need to undergo a size reduction process from the commercially-available product, such as by ball milling, planetary milling or thermal treatments, and sieving. The typical volume fraction of powder in the ink is 15% or higher, for example in the range 30-40%.

The magnetisable ink is printed on the document by any appropriate process such as silk screen, intaglio, gravure, offset or inkjet. In FIG. 1 the patches 2 are in the form of simple squares although in principle regions of the magnetisable ink may be printed onto the document in any desired form, including other geometrical shapes, numbers or letters, line patterns or pictorial representations. If required a surface coating such as varnish may be applied over the magnetisable ink regions, to protect them from abrasion and reduce surface roughness. In any event, once printed the regions are magnetised to present a multipole sequence of alternating polarity. In the case of each of the patches 2 of FIG. 1 the magnetised pattern is in the form of a sequence of equi-spaced parallel linear poles extending parallel to the fold line 3. The magnetic alignment is achieved by applying a strong magnetic field of the desired pattern to each patch, while the ink is still wet in the case of an anisotropic powder or when it is wet or dry in the case of an isotropic powder. It can be achieved by any appropriate method known to those skilled in the art, such as by electromagnet, pulsed field magnetiser, superconducting magnet or permanent magnet system, but a preferred method will be described with reference to FIG. 2.

Figure 2:
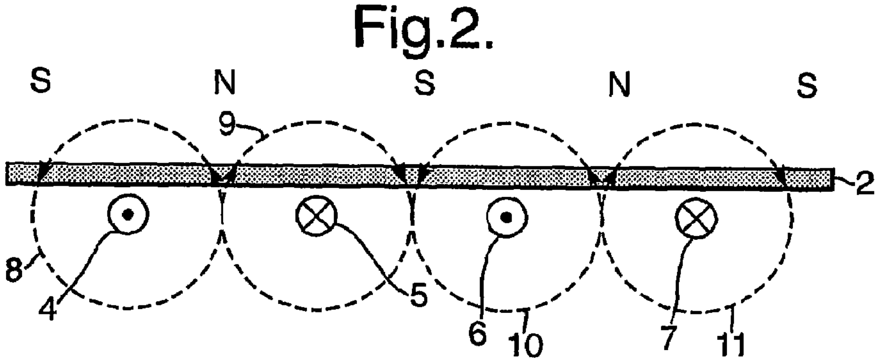
FIG. 2 is a cross section through an ink patch on the banknote of FIG. 1 in the course of magnetisation.

FIG. 2 shows a magnetic ink patch 2 in close proximity to a pulse magnetiser fixture comprising current-carrying conductors 4-7, the directions of the currents in respective conductors being shown as extending alternately out of and into the plane of the paper in accordance with conventional symbology. In practice each conductor 4-7 is a parallel limb of a single copper wire wound in serpentine fashion. They generate respective magnetic fields 8-11 of alternating directions as indicated in the Figure, to produce a sequence of linear poles of alternating polarity in the patch 2, in this case S—N—S—N—S. Although a sequence of only five poles is shown for ease of illustration, in practice there may be 20 or more in a patch 2 cm square, the typical line separation being in the range 0.3 mm to 3 mm.

The principle of a pulse magnetiser is that a capacitative discharge unit is used to provide the magnetising fixture with a very large current over a short period of time. In this manner the fixture can deliver the very high fields necessary for saturating NdFeB and SmCo class materials for example, whilst maintaining its temperature increase (due to ohmic heating) below the level which would cause failure of the copper wire. Extreme forces are also generated between the conductors due to the interaction of the generated fields. The high currents required, ohmic heating, inter-conductor forces and pulse control are all factors which must be calculated and accounted for in the design of the magnetising fixture and power source. This is a highly specialised technique and would present a significant barrier to a would-be counterfeiter reproducing the pattern of magnetisation from an existing document.

Figure 3A:
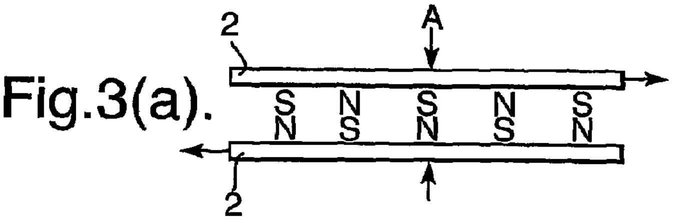
FIG. 3 is a diagram illustrating the generation of a touch-sensitive effect in the course of relative movement between two magnetised ink patches in accordance with the invention.
Figure 3B:
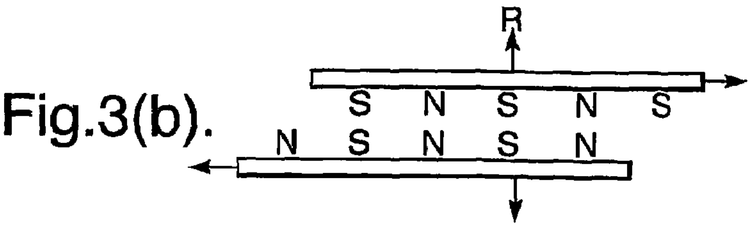
Figure 3C:
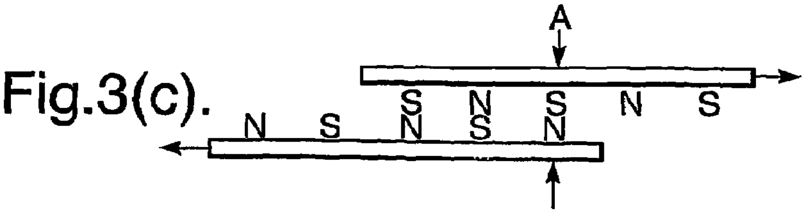

In order to verify the authenticity of a document 1 as illustrated in FIG. 1 and magnetised as described with reference to FIG. 2, it is folded about the line 3 to bring the two patches 2 of magnetised ink into a confronting relationship and, with the parts of the document bearing the confronting patches held between finger and thumb, the two leaves are slid back and forth relative to each other in the direction of the pole sequences in each patch 2 (that is to say transverse to the linear directions of the individual poles). Alternatively the document can be folded over on the palm of the hand (or other suitable surface) to bring the two patches into confronting relationship and the upper leaf slid back and forth over the lower leaf with a finger pressed onto the part of the upper leaf bearing its patch. The effect of the relative movement between the patches 2 in either case will be explained with reference to FIG. 3. That is to say, FIG. 3(*a*) indicates an (arbitrary) initial condition where the two patches are in contact with the poles of each patch in register with unlike poles of the other patch. A force of attraction A will therefore exist between them. As the patches are moved relative to each other in the specified direction they next reach a condition as indicated in FIG. 3(*b*) where like poles of each one are in register. A force of repulsion R will therefore now exist between them. With further relative movement in the same direction the condition indicated in FIG. 3(*c*) is reached where once again unlike poles of the two patches are in register and a force of attraction A is generated, and so on. In other words as the two leaves are slid relative to each other the patches 2 are alternately attracted to and repelled by each other, and an equivalent process of alternating attraction and repulsion will occur when the direction of relative movement is reversed. The effect is that the movement between the patches takes place in a series of small jerks as they transition between successive positions of attraction via intervening positions of repulsion. The sensation felt through the user's fingertip(s) as this occurs is quite distinctive and suggests that the folded document has a physically rippled texture, notwithstanding that the patches 2 actually have a smooth surface. It is also possible to hear the effects of the distinctive jerking movement between the two patches.

The above-described effect therefore provides a means for discriminating through the sense of touch between a genuine document which bears regions of magnetised ink in accordance with the invention and a counterfeit which may be visually identical but unmagnetised or not correctly magnetised. Such a measure could be implemented in an overt manner—for example the public could be educated that genuine banknotes which are physically smooth should nevertheless feel textured when folded and rubbed together in a particular way. Alternatively it could be implemented covertly and knowledge of the means of authentication restricted to authorised officials—in the case of passport control for example—since it would not be visually apparent that any given printed region of a document is magnetised and magnetised regions could be overprinted or otherwise effectively concealed within the overall graphical content of a document.

Note that while FIG. 3 shows an example where there are only five linear magnetic poles in each patch 2 this is for ease of illustration only and, as previously indicated, in practice there may be many more. Similarly, while FIG. 3 indicates that there is an inverse sequence of poles in the two patches, namely S—N—S—N—S and N—S—N—S—N respectively, this need not be the case so long as they alternate in each patch, particularly as the absolute number of poles increases.

The typical area of a magnetised ink patch 2 is in the range 25-2500 mm$^2$ and in preferred embodiments is 100-400 mm$^2$. The typical thickness of the ink layer is in the range 10-200 μm and in preferred embodiments is 20-30 μm. The thickness of any coating of varnish or the like over the ink patches should be the minimum necessary to provide the required protection and reduction of surface friction, and in a preferred embodiment is around 4 μm. The strength of the magnetic forces generated between the patches depends on the amount of magnetised powder contributing and thus increases with both patch thickness and powder volume fraction. It also increases with decreasing separation distance between adjacent poles in the sequence. The minimum force which is detectable by the human sense of touch varies with the stimulation frequency (which in this case is a function of the speed of relative movement between the magnetised patches and the pole separation distance) but is believed to be of the order of 0.01 to 0.1 Newtons. By way of example, the force of attraction or repulsion between two magnetised ink patches of the kind described above, of size 10 mm×10 mm, ink thickness 30 μm, saturated NdFeB powder loading 35% by volume and pole line separation 1 mm, has been estimated to be 0.09N at a distance between the patches of 10 μm. Therefore a force variation of 0.18N will be experienced in the transition between attractive and repulsive orientations of the patches.

It is of note that a multipole pattern of the kind described herein has nolong range magnetic field. The field strength drops off very quickly with distance away from the surface of the magnetised region and, for example, banknotes with magnetised patches as described above are unlikely in normal use to affect the conventional magnetic stripes of credit cards which may be kept in the same wallet or purse. Neither should any difficulties be caused by interactions between the magnetised patches of stacked banknotes, where they are separated by the thickness of the substrate on which they are printed (typically 60 μm).

The example of the invention described with reference to FIG. 1 is “self-authenticating” in that the document 1 itself bears both patches 2 required for authentication by the touch-sensitive method described. In other embodiments, however, the authentication could be performed by means of a separate “key” device magnetised with an appropriate pole sequence which is rubbed over one or more magnetised ink patches on the document or vice versa. In this case the document need not be foldable and could comprise, for example, a certification label attached to merchandise.

Figure 4:
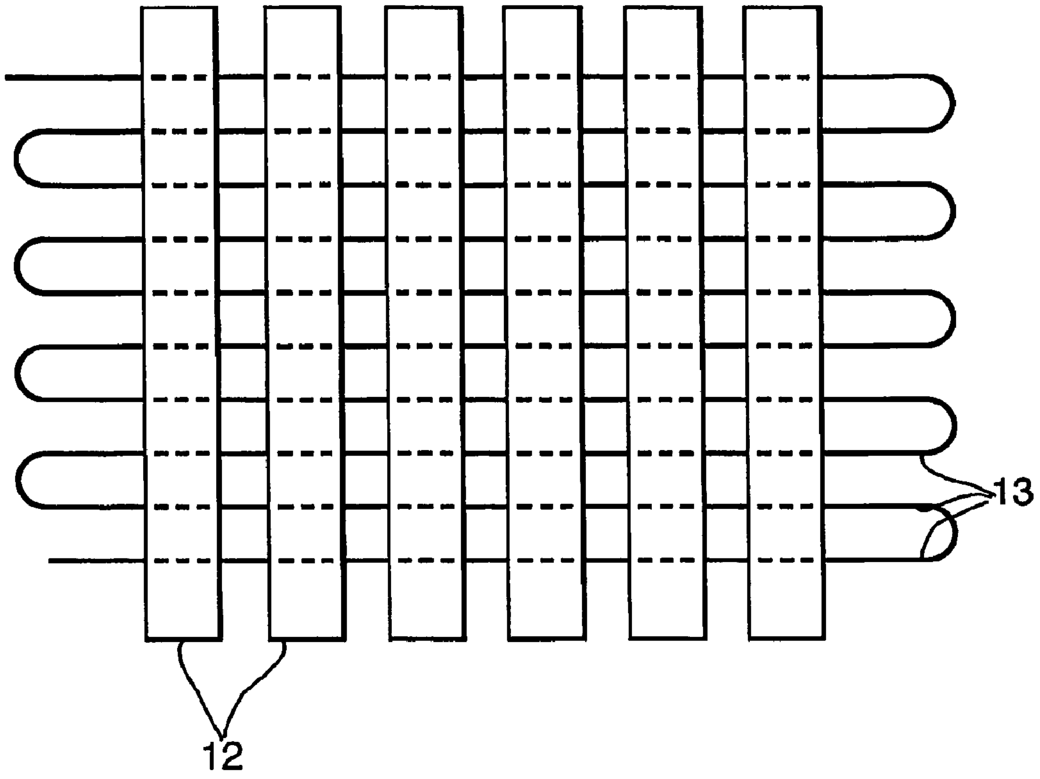
FIG. 4 illustrates an example of a counter-intuitive magnetised ink patch for use in the invention.

FIG. 4 illustrates a “counter-intuitive” example of a magnetised ink region for use in document authentication in accordance with the invention. In this case the ink is printed onto the document in a series of discrete bars 12. It is magnetised, however, to produce poles which individually extend orthogonally to the bars 12, as indicated by the direction of the limbs 13 of a magnetising conductor indicated in the Figure. In other words, to produce the touch sensitive effect described above it is necessary to rub this region with another suitably magnetised region in the direction along the length of the bars 12, whereas the appearance of the series of bars 12 would intuitively lead to an expectation of texture being felt by rubbing in the orthogonal direction, ie across the series. Any other desired angular relationship between the bars 12 and the pole directions could of course be produced by appropriately selecting the angle between the bars 12 and limbs 13 during magnetisation.

Figure 5:
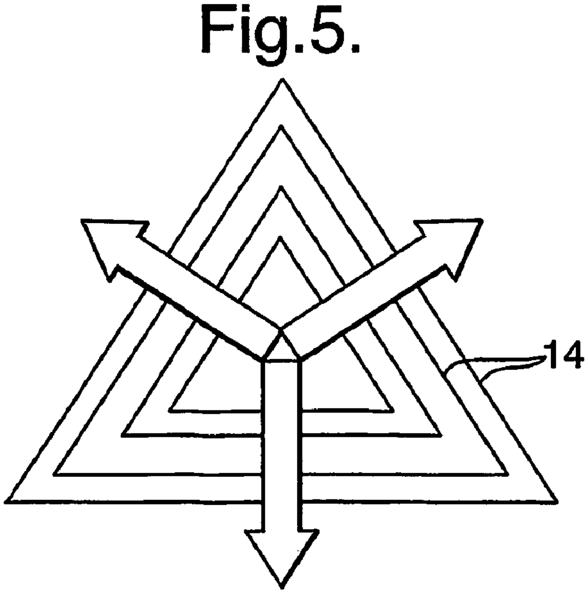
FIG. 5 illustrates a multi-directional pattern of magnetisation for an ink patch for use in the invention.

FIG. 5 illustrates an example of a magnetisation pattern where the touch sensitive effect can be exhibited in a plurality of directions. In this case an ink patch is magnetised with poles 14 in a triangular configuration so that an alternating sequence will be encountered when rubbed with another suitably magnetised region in each of the three directions (and their reverse) indicated by the arrows in the Figure.

The invention claimed is:

1. A method of checking the authenticity of a document bearing a region of magnetic ink which is magnetised to present a multipole sequence of alternating polarity, the method comprising the step of causing relative movement between said region and a second magnetic region which presents a multipole sequence of alternating polarity, said relative movement being in the direction of said sequences, and detecting by the human sense of touch the consequent process of alternating attraction and repulsion between those regions in the course of such relative movement.

2. A method according to claim 1 wherein said second region is a second region of magnetic ink on said document and the method comprises folding the document to bring the two regions into a confronting relationship and manipulating the document to cause said relative movement.

3. A method according to claim 1 wherein said second region is borne by a structure separate from said document and the method comprises passing said structure across the first-mentioned region or vice versa.

4. A document bearing a first and second regions of magnetic ink which are magnetised to present respective multipole sequences of alternating polarity, whereby the authenticity of said document can be checked by causing relative movement between said regions in the direction of said sequences and detecting by the human sense of touch the consequent process of alternating attraction and repulsion between those regions in the course of such relative movement.

5. A document according to claim 4 wherein said magnetic ink comprises ink loaded with magnetisable powder.

6. A document according to claim 5 wherein said powder comprises one of the following alloys: neodymium iron boron; samarium cobalt; barium ferrite; strontium ferrite; aluminium nickel cobalt; cobalt phosphorus; iron platinum; cobalt platinum.

7. Means A document according to claim 5 wherein said powder has a particle size distribution in the range 1-20 μm.

8. A document according to claim 5 wherein the volume fraction of powder in the ink is at least 15%.

9. A document according to claim 4 wherein the area of a said region of magnetic ink is in the range 25-2500 $mm^2$.

10. A document according to claim 4 wherein the thickness of a said region of magnetic ink is in the range 10-200 μm.

11. A document according to claim 4 wherein a said region of magnetic ink presents a sequence of parallel linear poles.

12. A document according to claim 11 wherein the ink in a said region is deposited in a plurality of discrete linear formations and said poles extend at an angle to the direction of said formations.

13. A document according to claim 11 wherein a said region presents a plurality of such sequences extending in mutually inclined directions.

14. A document according to claim 4 wherein the poles in a said sequence are spaced at intervals in the range 0.3-3 mm.

15. A document according to claim 4 wherein a said region of magnetic ink has a coating of material to reduce friction.

16. A document adapted to have its authenticity checked by a method according to claim 1.

17. A document authentication system comprising: a document bearing a region of magnetic ink which is magnetised to present a multipole sequence of alternating polarity, and a structure separate from said document bearing a second magnetic region which presents a multipole sequence of alternating polarity, whereby the authenticity of said document can be checked by causing relative movement between said regions in the direction of said sequences and detecting by the human sense of touch the consequent process of alternating attraction and repulsion between those regions in the course of such relative movement.

18. The document authentication system of claim 17 wherein said second region is a second region of magnetic ink.

19. The document authentication system of claim 17 wherein said magnetic ink comprises ink loaded with magnetisable powder.

20. The document authentication system of claim 19 wherein said powder comprises one of the following alloys: neodymium iron boron; samarium cobalt; barium ferrite; strontium ferrite; aluminium nickel cobalt; cobalt phosphorus; iron platinum; cobalt platinum.

21. The document authentication system of claim 19 wherein said powder has a particle size distribution in the range 1-20 μm.

22. The document authentication system of claim 19 wherein the volume fraction of powder in the ink is at least 15%.

23. The document authentication system of claim 17 wherein the area of said region of magnetic ink is in the range 25-2500 $mm^2$.

24. The document authentication system of claim 20 wherein the thickness of said region of magnetic ink is in the range 10-200 μm.

25. The document authentication system of claim 17 wherein said region of magnetic ink presents a sequence of parallel linear poles.

26. The document authentication system of claim 25 wherein the ink in said region is deposited in a plurality of discrete linear formations and said poles extend at an angle to the direction of said formations.

27. The document authentication system of claim 25 wherein said region of magnetic ink presents a plurality of such sequences extending in mutually inclined directions.

28. The document authentication system of claim 17 wherein the poles in a said sequence are spaced at intervals in the range 0.3-3 mm.

29. The document authentication system of claim 17 wherein said region of magnetic ink has a coating of material to reduce friction.

* * * * *